Dec. 30, 1947.   W. F. TRIPLETT   2,433,492
ANTIFRICTION BEARING FOR RAILWAY JOURNAL BOXES
Filed July 1, 1946
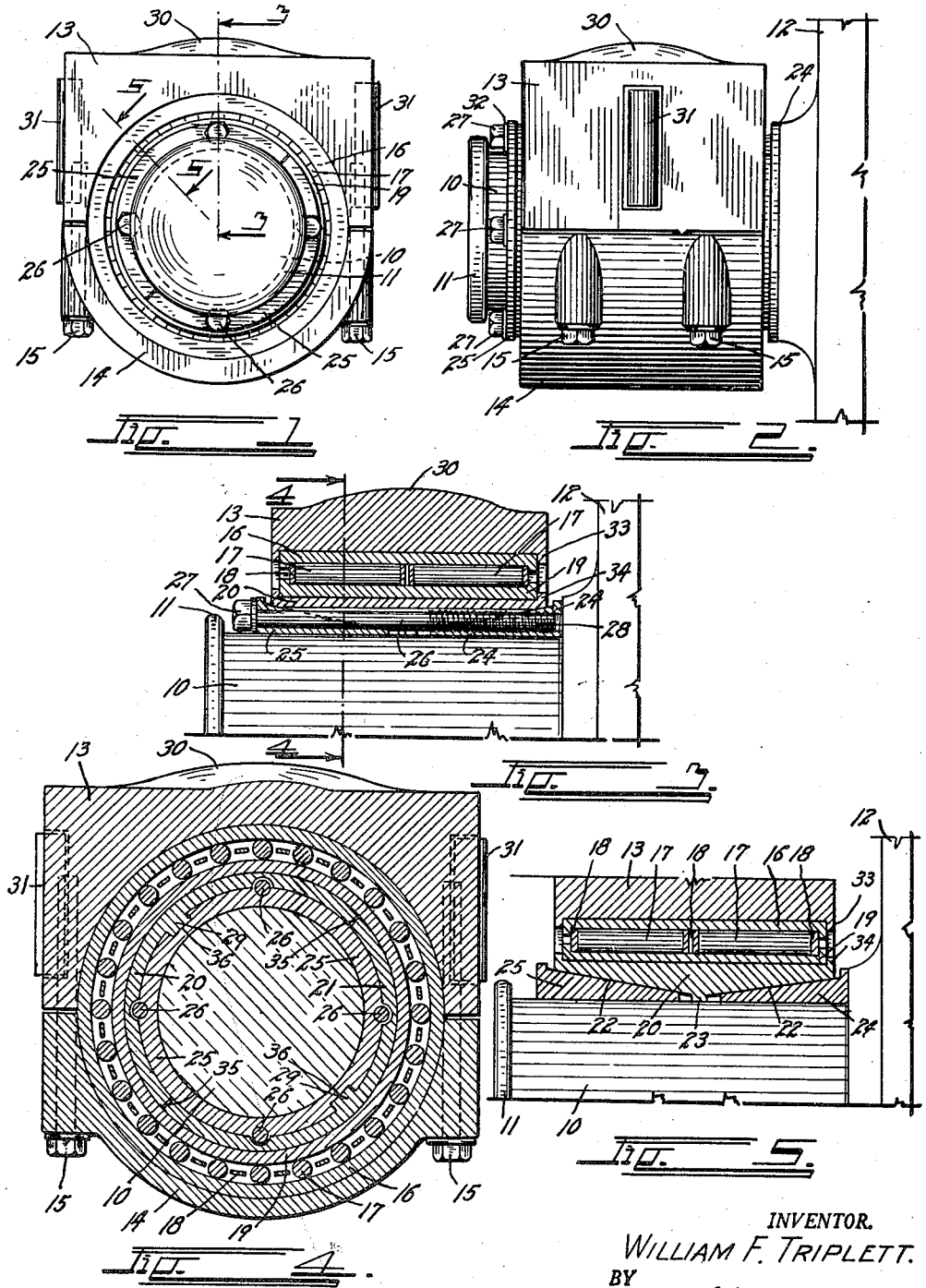
INVENTOR.
WILLIAM F. TRIPLETT.
BY
ATTORNEY.

Patented Dec. 30, 1947

2,433,492

UNITED STATES PATENT OFFICE 2,433,492

ANTIFRICTION BEARING FOR RAILWAY JOURNAL BOXES

William F. Triplett, Grand Junction, Colo.

Application July 1, 1946, Serial No. 680,705

6 Claims. (Cl. 308—180)

1

This invention relates to an anti-friction bearing for railway car journals.

Anti-friction bearings have been, and are being, used on railway car journals. The usual bearing of this type, however, cannot be installed into the standard journal boxes and onto the standard flanged wheel axle, due to the fact that the conventional flange on the axle will not allow the bearings to be slid over the journal. Therefore, to install the present anti-friction bearings, it is necessary to either have a special journal box and axle or to remodel the present axle by turning the flanges from the extremities thereof.

The principal object of this invention is to provide an anti-friction bearing which can be installed on the present railway car wheel axles without requiring changes therein, and which will fit into the present journal boxes in the place of the conventional bronze bearings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an end view of a conventional railway wheel axle, illustrating the invention in place thereon;

Fig. 2 is a side view of the improved anti-friction bearing in place on an axle;

Fig. 3 is an enlarged detail section, taken on the line 3—3, Fig. 1;

Fig. 4 is a cross-section through the journal and axle, taken on the line 4—4, Fig. 3; and Fig. 5 is a detail, fragmentary section, taken on the line 5—5, Fig. 1.

In the drawing a conventional railway car wheel axle journal is indicated at 10, with its terminal flange at 11. A fragment of the adjacent wheel is indicated at 12.

In the usual journal, the axle 10 projects into an enclosing journal box having an upper brass or bronze bearing block provided with a semi-cylindrical socket in its bottom which rests on and over the axle 10. This invention is designed to replace this usual brass or bronze bearing block and to occupy the same position in the journal box as is now occupied by the brass bearing.

The invention comprises a bearing block 13

2 similar in size and shape to the usual brass or bronze bearing block. A bearing cap member 14 is attached below the block 13 and clamped thereto by means of suitable cap screws 15. The block 13 and the cap 14 surround, and are clamped to, an outer bearing race 16 against which a plurality of rolling anti-friction bearing members bear.

The bearing members may have any of the conventional designs, such as ball bearings, tapered roller bearings, or cylindrical roller bearings, as preferred. As illustrated, they consist of a plurality of cylindrical roller bearings 17 held in proper spaced relation by means of spacing cages 18.

The roller bearings 17 are positioned between the outer race 16 and a complementary inner race 19. The axle opening in the inner race 19 is sufficiently large to allow it to be passed over the standard axle flange 11 of the conventional axle. Since this opening is larger than the axle journal 10, means are provided to fill the intervening circular space.

This is accomplished by supporting the inner race 19 on two similar semi-circular outer shoes 20 and 21 which, when together, form a complete cylindrical support for the inner race 19. The shoes 20 and 21 are formed with inner and outer inclined internal surfaces 22 and extend completely around the inner circumferences thereof and terminate at the medial line in an inwardly projecting spacing bead 23, which spaces the shoes 20 and 21 concentrically about the axle 10.

The shoes 20 and 21 are rigidly and permanently locked in place around the axle 10 by means of four semi-circular wedge members, there being two inner wedge members 24, placed adjacent the wheel 12, and two outer wedge members 25, placed adjacent the flange 11. When the wedge members are together and in position, they form inner and outer external conical surfaces which rest against the inclined surfaces 22 of the shoes 20.

Each outer wedge member 25 is anchored to an, oppositely facing, inner wedge member 24 by means of clamp screws 26. The screws 26 are provided with wrench-engaging heads 27 which bear against the outer wedge members, and with threads 28 which are threaded into the inner wedge members.

It can be readily seen that, if the screws 26 are tightened, they will serve to draw the inner wedge members 24 and the outer wedge members 25 toward each other so as to wedge them both between the shoes 20 and the axle 10 to prevent relative rotation therebetween. Relative rotation between the shoes 20 and the wedge members is prevented by means of splines 29 formed on the shoes and projecting inwardly therefrom. These splines are received in notched extremities on the wedge members, as shown in Fig. 4, so as to key the entire assembly together.

The improved anti-friction bearing is installed by placing the bearing block 13 in the standard journal box in place over the conventional brass bearing. The box is then brought over the journal extremity of the axle 10 and is jacked up therefrom sufficiently to allow the anti-friction bearing consisting of the races 16 and 19, and the roller bearings 17, to be slipped over the flange 11 and into the block 13.

One of the inner wedge members 24 is then spaced over the axle 10 adjacent the wheels 12. The upper half of the shoes 20 is then forced between the anti-friction bearing and the journal over the wedge member 24. An outer wedge member 22 is then slipped between the shoe and the journal. The remaining portions of the shoe and the wedge member are now placed into position, supported by the anti-friction bearing.

The cap 14 is then raised into position and clamped in place by means of the cap screws 15. The clamp screws 27 are now tightened equally to a safe limit of stress and the bearing is ready for use.

It is preferred to form a rounded bearing boss 30 on the top of the member 13 to allow it to tilt and move freely to provide self-alignment for the bearing. A side roller 31 is installed in each side of the bearing block 13 to bear against the sides of the standard journal box to allow horizontal turning of the bearing in the box to accommodate curves, braking stresses, etc. The combination of the rollers 31 and the box 30 provides a universally self-adjusting bearing.

It is preferred to employ lock washers 32, or any other suitable holding device, beneath the heads 27 of the bolts 26, to resist loosening of the bolts.

The upper race 16 may be prevented from lateral displacement by means of retaining flanges 33, or in any other desired manner. The inner race 19 may be prevented from lateral displacement on the shoes 20 by means of similar flanges 34. To facilitate installation, however, the inner flange 34 is omitted from one of the semi-circular shoes 20 so that the latter may be slid into place after the other semi-circular portion of the shoe is in position.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; and wedge members filling the intervening space between the axle and the anti-friction bearing and securing the latter to the axle.

2. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; sectional bearing shoes fitted within said anti-friction bearing; inclined inner surfaces on the opposite sides of said bearing shoes; wedge members fitted between the inclined surfaces and the axle; and means for forcing said wedge members against said inclined surfaces.

3. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; sectional bearing shoes fitted within said anti-friction bearing; inclined inner surfaces on the opposite sides of said bearing shoes; wedge members fitted between the inclined surfaces and the axle; and clamp bolts extending between the opposite wedge members parallel to the axis of said axle and acting to draw the wedge members toward each other to exert a clamping action between the axle and the shoes.

4. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; sectional bearing shoes fitted within said anti-friction bearing; inclined inner surfaces on the opposite sides of said bearing shoes; wedge members fitted between the inclined surfaces and the axle; the clamp bolts extending between the opposite wedge members parallel to the axis of said axle and acting to draw the wedge members toward each other to exert a clamping action between the axle and the shoes; and means for preventing relative rotation between said shoes and said wedge members.

5. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; wedge members filling the intervening space between the axle and the anti-friction bearing and securing the latter to the axle; and a rounded boss projecting upwardly from said bearing member to support the journal box thereon.

6. An anti-friction bearing for installation in a conventional railway car journal box to support the latter upon a wheel axle, comprising: an upper bearing block adapted to be received in the journal box over the axle; a lower cap member; means for clamping said lower cap member to the upper bearing block so that the former will enclose the lower portion of the axle; a cylindrical anti-friction bearing clamped between said cap member and said block, said bearing having a larger inner diameter than the diameter of said axle; wedge members filling the intervening space between the axle and the anti-friction bearing and securing the latter to the axle; and a vertically positioned roller at each side of said bearing block, spacing the latter from the side of the journal box.

WILLIAM F. TRIPLETT.